United States Patent [19]

Schmidt

[11] 4,348,255

[45] Sep. 7, 1982

[54] PROCESS FOR THE PREPARATION OF AN OPTICALLY TRANSPARENT AND ELECTRICALLY CONDUCTIVE FILM PATTERN

[75] Inventor: Walter Schmidt, Zurich, Switzerland

[73] Assignee: BBC Brown, Boveri & Company, Ltd., Baden, Switzerland

[21] Appl. No.: 165,714

[22] Filed: Jul. 3, 1980

[30] Foreign Application Priority Data

Jul. 4, 1979 [CH] Switzerland .................. 6229/79

[51] Int. Cl.³ .................... C23F 1/02; B44C 1/22
[52] U.S. Cl. .................... 156/656; 156/635; 156/667; 252/79.2; 252/79.4
[58] Field of Search .................. 427/102, 264, 271; 252/79.2, 79.4; 156/635, 638, 654, 655, 656, 658, 667

[56] References Cited

U.S. PATENT DOCUMENTS

| | | | |
|---|---|---|---|
| 2,127,781 | 8/1938 | McKay | 156/663 X |
| 2,944,926 | 7/1960 | Gaiser | 156/101 |
| 3,483,027 | 12/1969 | Ritzerfield et al. | 156/658 X |
| 3,647,508 | 3/1972 | Gorrell | 252/79.4 X |

Primary Examiner—William A. Powell
Attorney, Agent, or Firm—Oblon, Fisher, Spivak, McClelland & Maier

[57] ABSTRACT

An optically transparent and electrically conductive film pattern on a substrate, e.g., an electrooptical display plate provided with a patterned transparent electrode layer, is prepared by a process in which an optically transparent layer of electrically conductive material, coated on the substrate, is removed in predetermined areas by an etching treatment. In this process, the areas of the optically transparent layer on the substrate which are to be removed by etching are printed with an etchant composition which contains an etching agent for the electrically conductive material. The composition is then allowed to remain in contact with the electrically conductive material in order to etch through the areas covered by the composition. Finally, the products formed by reaction of the etchant products formed by reaction of the etchant with the conductive material are removed together with the unspent portions of the composition.

10 Claims, 2 Drawing Figures

PROCESS FOR THE PREPARATION OF AN OPTICALLY TRANSPARENT AND ELECTRICALLY CONDUCTIVE FILM PATTERN

BACKGROUND OF THE INVENTION

1. Field of the Invention

This invention relates to the preparation of optically transparent electrode layers and more particularly to the preparation of such layers which are arranged in a pattern on a substrate for use in electro-optical displays.

2. Description of the Prior Art

In various types of electro-optical displays, for example, liquid crystal displays, a dielectric medium is interposed between a continuous electrode layer and a transparent patterned electrode layer. By electrically energizing selected portions of the patterned transparent layer, an electric field is applied to the dielectric medium between the energized portion of the patterned electrode and the continuous electrode. This electric field can modify the properties of the dielectric medium, for example of a liquid crystal layer, so that a display corresponding to the energized areas is made visible through the transparent patterned electrode.

The transparent patterned electrically conducting electrodes are generally supported on transparent support plates or substrates. The electrodes are usually prepared by first coating one surface of the support, for example by vapor deposition or sputtering in vacuo, with a continuous thin film of a transparent, electrically conductive material, for example, semiconductive metal oxides such as $In_2O_3$ and/or $SnO_2$, and then selectively removing portions of the deposited film by etching to produce a patterned electrode. As freshly deposited, that is without heat treatment, the vapor deposited or sputtered films can be etched relatively easily with acids. In order to confine the etching to selected areas, the film is covered with a photoresist, which is a layer of photopolymerizable material. The photoresist is then polymerized imagewise by exposure to actinic radiation. The unpolymerized resist in the unexposed areas can then be removed, for example by a suitable solvent, to form the windows of an etching mask. Subsequently, the uncovered areas of the transparent electrically conductive film are etched away, and the photoresist layer is removed from the covered areas of the transparent electrode film, which remain on the substrate. This photoresist etching process makes it possible to prepare very complex patterned electrodes and those having very fine lines. However, it is very expensive and/or time-consuming.

Transparent patterned electrodes can also be prepared by vapor-depositing the electrically conductive material for the transparent electrode film in the desired pattern onto the appropriately masked substrate. The areas of the substrate which are not to receive an electrode film are covered either with a metal mask placed in contact with the substrate or by a corresponding mask pattern which is printed onto the substrate (see, for example, German Auslegeschrift No. 2,322,826). Masking using a metal mask presents problems since it is very difficult to attain the necessary close contact between the mask and the substrate and there is a very great risk of unsharp masking with a corresponding poor definition of the vapor-deposited pattern. Printing a mask on the substrate before the film is vapor-deposited also presents problems, since the printed masking layer produces so-called marginal shadows and can thus impair the definition of the electrode pattern. Moreover, the printed mask first must be dried before the vapor-deposition step and must be removed after vapor deposition, for example by washing, burning off, or brushing. The removal is made more difficult by the layer of vapor deposited material which covers both the masked and unmasked areas.

Therefore, a need has continued to exist for a method of producing patterned transparent electrodes on substrates which avoids the problems introduced by the known methods of etching or masking.

SUMMARY OF THE INVENTION

Accordingly, it is an object of the invention to provide a process for the preparation of an optically transparent and electrically conductive film pattern on a substrate.

A further object is to provide a process for preparing optically transparent electrodes which retains the advantages of the etching process, namely, sharp definition of the electrode pattern, obtained by etching away a previously formed transparent electrode layer, while at the same time avoiding the production engineering disadvantages involved in preparing a photoresist mask.

Further objects of the invention will become apparent from the description of the invention which follows.

Accordingly, the objects of the invention are realized by:

(a) providing a layer (electrode layer) of an optically transparent electrically conducting material, e.g. a semiconducting metal oxide such as $In_2O_3$ and/or $SnO_2$, on a substrate (usually also transparent), (b) applying, by printing, to selected areas of the electrode layer which are to be removed, an etchant composition comprising an etchant for said optically transparent electrically conducting material, (c) allowing said etchant composition to contact the layer of optically transparent electrically conductive material until said material has reacted with said etchant in the printed areas, and (d) removing the reaction products of the reaction between the etchant and the optically transparent and electrically conducting material, from the substrate. Any known printing process can be used to apply the etchant composition to the layer of electrode material, e.g. a silk screening printing process.

BRIEF DESCRIPTION OF THE DRAWINGS

A more complete appreciation of the invention and many of the attendant advantages thereof will be readily attained as the same becomes better understood by reference to the following detailed description when considered with the accompanying drawings, wherein.

DETAILED DESCRIPTION OF THE INVENTION AND PREFERRED EMBODIMENTS

Figures 1, 2:
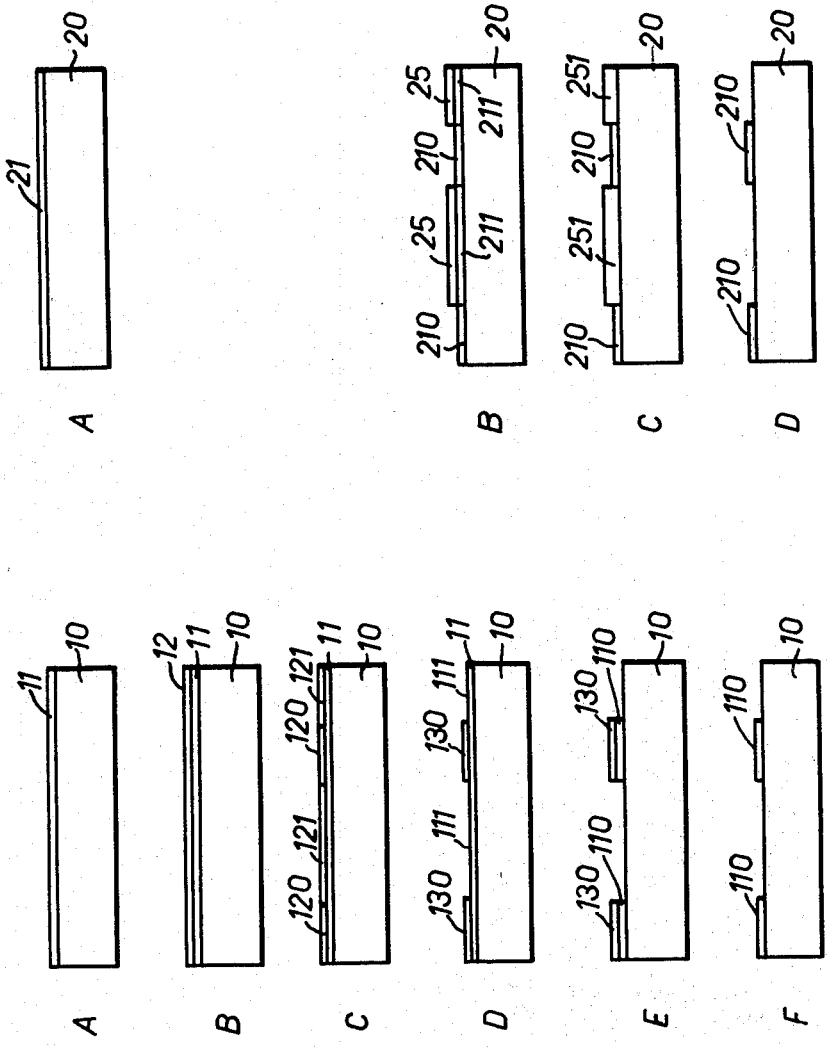
FIG. 1 is a schematic representation of the steps of the known photoresist etching process.
FIG. 2 is a schematic representation of the steps of the process of this invention.

The layer of etchant composition which is printed on the areas of the transparent electrode area which are to be etched is preferably thin, for example, 5 to 50 micrometers. The etchant composition comprises, in most cases, a mineral acid, such as phosphoric acid preferably mixed with a carrier. Since the transparent electrode layer to be etched is generally relatively thin, e.g., 0.01 to 0.05 micrometers, it is possible with a printed layer of the above-mentioned thickness to obtain rapid and complete etching of the electrode layer areas which are to be removed, by using a composition ("printing paste" or "printing ink") which contains only a few percent of mineral acid, even at normal or moderately elevated temperatures and with an etching period of several seconds to a few minutes.

The printed etching layer is then removed from the electrode layer together with the etching products. This can be accomplished without problems simply by rinsing. Preferably, the composition contains a carrier which (a) is inert towards the electrode layer, i.e., does not modify the latter chemically or otherwise, (b) is compatible or miscible with the etching agent, (c) is soluble in a suitable solvent, preferably an organic solvent, and (d) imparts to the composition the viscosity or consistency suitable for the selected printing process (no spreading on the substrate printed with the composition).

In FIG. 1, which illustrates the known photoresist process, stage A shows the substrate or support layer 10, for example a 0.2 to 1.5 mm thick glass plate with a layer 11 (conductive layer), applied in the customary manner, of a transparent electrically conductive material, for example $In_2O_3$ which is doped with $SnO_2$. Such coated substrates are commercially obtainable.

According to stage B of FIG. 1, a photoresist layer 12 is applied to the conductive layer 11 and is dried, that is to say stage B comprises at least two steps. In stage C of FIG. 1, the photoresist is exposed imagewise through a mask (not shown), so that exposed areas 120 and unexposed areas 121 of the photoresist layer are formed. In stage D of FIG. 1, the etcing mask 130 formed by "developing" the photoresist layer is shown on those parts of the conductive layer 11 which are not to be etched. Thus, the transition from stage C to stage D according to FIG. 1 also usually involves several steps (curing of the masked areas 120, removal of the window areas 121 and, if necessary, cleaning).

Stage E of FIG. 1 shows the areas 110 of the conductive layer, which remain covered with the mask 130 after the uncovered conductive layer areas (111 of stage D) have been etched away.

Stage F of FIG. 1 shows the substrate 10 with the conductive layer areas 110 of the finished pattern, after the etching mask areas 130 have been removed.

In FIG. 2, which illustrates the process of this invention, the starting material, shown in Stage A, corresponds to the starting material of the known process explained in FIG. 1; it consists of the substrate or support plate with a continuous layer 21 (conductive layer) applied thereto and it is commercially obtainable like the starting material of the known process according to FIG. 1.

The stages of applying the etching mark of photoresist, which have been explained in FIG. 1 and some of which generally involve several steps (that is to say stages B, and C of FIG. 1), are eliminated. Instead, according to the invention as shown in stage B of FIG. 2, a layer 25 of an etchant composition, in the form of a pattern, is printed onto those areas 211 of the conductive layer 21 of the starting material (stage A) which are to be removed by etching, while the desired conductive layer areas 210 of the electrode pattern which is to be prepared remain free of etchant composition.

Without special additional measures or, if necessary, by gentle warming (general range from 0° C. or lower to about 100° C., preferably 30-60° C.), the state shown in stage C of FIG. 2, wherein the etched areas 251 are shown between the unetched conductive layer areas 210 on the substrate 20, is reached in a very short time. The etched areas generally comprise, for by far the greatest part, the unspent quantities of the printed etching agent composition and the products of the reaction of etching agent and conductive layer material. For example, if phosphoric acid is used, which is preferred for many purposes according to the invention, to etch an $In_2O_3/SnO_2$ conductive layer, these products will comprise indium phosphate and tin phosphate plus water. The product of the last stage of the process according to the invention (D, FIG. 2) is equivalent to that of the known process, but it can be obtained by simply washing off the etched areas 251 of the product from stage C, FIG. 2, for example, by immersion into a suitable solvent.

A number of variations of the process according to the invention, which can readily be understood from the explanation of the scheme of FIG. 2 can be made by those skilled in the art to adapt the method to a particular intended use.

The process is also suitable for applications other than the preferred preparation of patterned electrodes for liquid crystal displays. It can be used for all purposes which require films on a substrate, which are applied in areas or in a pattern and consist of a conductive and preferably transparent material. Examples of this are cover glasses for highly sensitive measuring instruments.

Moreover, the nature of the substrate (20, FIG. 2) or support is not critical as long as the substrate is suitable for printing with a layer of an etching composition, that is to say has at least one virtually planar surface with the conductive layer applied thereto. Silicate glass is a typical example; quartz glasses or organic glasses can also be used as the substrate. The part of the substrate provided with the conductive layer is normally an electrical insulator, but remote parts of the substrate can consist of a conductive material. A substrate suitable as a support according to the invention can thus also be a multi-component structure or laminated structure.

The material used for the conductive layer (21, FIG. 2) or its thickness and other properties are of importance only with respect to the end use of the product of the process according to the invention, but not with respect to the process itself. In place of the semi-conducting oxides of metals, such as indium and/or tin, which are customary for these conductive layers, oxides of zinc, which are doped with antimony oxide, and of cadmium, can also be used. The preferred conductive layer material based on indium oxide is commercially obtainable under the tradename ITO. However, correspondingly thin metal layers can also be optically transparent or translucent—that is to say they have adequate optical transmission—and can be etched in accordance with the invention.

Special pretreatments of the substrate provided with the conductive layer are not necessary for the process according to the invention. Such treatments, for example, a heat treatment, are generally inappropriate if they modify or reduce the ability of the conductive layer to be etched.

Conventional screen printing (serigraphy) is preferred as the printing process for applying the layer of etching composition (25, FIG. 2) to the selected areas. This printing process enables very fine patterns, for example, with line widths of only 0.1 mm, to be printed with good definition and to be etched away in accordance with the invention. Suitable screen printing machines are commercially obtainable and the conventional, correspondingly fine-meshed printing screens are either normally resistant to the etching agents preferred according to the invention or they can without difficulty be changed to resistant screens, for example, screens consisting of acid-resistant natural or synthetic filaments, such as silk, nylon, polyester, and the like.

The mask of the printing screen can be produced photolithographically in a conventional manner and, of course, it should be resistant, like the printing screen, to the etching agent of the composition used as the printing ink. In place of the generally preferred screen printing, the etching agent composition can also be applied by offset printing, dabbing and similar methods, as long as these enable the definition of the etched pattern, required by the particular intended use of the finished product, to be achieved.

The printing composition used according to the invention contains the etching agent, usually a mineral acid, diluted, if appropriate, with water or another solvent for the acid. Phosphoric acid is preferred because of its good etching action and advantageous technological properties, but other normally liquid or water-soluble acids, such as hydrohalic acids, for example aqueous HCl, oxygenated halogen acids, nitric acid, sulfuric acid or strong organic acids, which are capable of salt formation with the conductive layer material, can also be used.

In general, the composition contains an inert carrier in addition to the etching agent, as indicated above. The olephilic components, known as "binders" or vehicles, of printing inks are suitable for many purposes of the invention, for example the material based on cedar oil, which is commercially obtainable for screen printing compositions. Organic or inorganic oils, with thickeners if appropriate, are suitable materials for the inert carrier. The consistency of the etching composition can vary from liquid to pasty, depending on the type of printing process.

In general, the printing composition contains 1 to 50% by weight, preferably 3 to 40% by weight, of etching agent, the remainder being the inert carrier. Conventional additives for printing compositions can be used, but in most cases these have no particular advantages.

On the other hand, it can be advantageous if the viscosity of the composition can be controllably altered, for example by thermally initiated increase of the viscosity. For example, it is within the scope of the invention to polymerise the etching composition during the course of etching in order to diminish or eliminate the action of the etching agent during the course of etching as a result of an increasing matrix effect of the carrier.

The removal of the etching layer (251, FIG. 2), after the areas (211, FIG. 2) of the conductive layer which are to be removed have been completely etched through, generally within a period from 1 to 120 seconds depending on the temperature, can be accomplished by simple washing. In the case of oleophilic carriers, for example, organic lipophilic industrial solvents, such as trichloroethylene or gasoline can be used to wash off the etching composition. The use of water or of water-miscible solvents and, correspondingly, the use of hydrophilic carries of the printed-on composition is less preferred, since this can promote an uncontrolled or inadvertent etching of the conductive areas (210, FIG. 2) of the pattern to be prepared.

The substrate having an electrically conductive film pattern obtained by the process of the invention can be post-treated, for example by heat treatment or stoving, and used like the analogous products of the photoresist etching process in liquid crystal displays, such as are used for watches, measuring instruments, and numerous other purposes.

Having generally described this invention, a further understanding can be obtained by reference to certain specific examples, which are provided herein for purposes of illustration only and are not intended to be limiting unless otherwise specified.

EXAMPLE

50 Parts by weight of an essential oil (commercial product; binder for screen printing; based on cedar oil fractions) were thoroughly mixed with 10 parts by weight of concentrated phosphoric acid ($H_3PO_4$) in a laboratory mixer, until a composition of virtually homogeneous appearance and honey-like consistency was formed.

This composition was printed by means of a conventional screen printing apparatus onto the conductive layer (thickness 25 nm±1.25 nm), consisting of $IN_2O_3$/$SnO_2$, of commercially available small substrates of silicate glass. The thickness of the printed layer of etchant composition was 20 $\mu$m±5 $\mu$m. After an etching period of 5 seconds at 60° C., the printed composition was rinsed off with excess amyl acetate and the substrate, now provided with a conductive layer pattern, was allowed to dry in air. The conductive layer had a pattern corresponding to the configuration of the printing screen, with high resolution (well defined line widths of 0.1 mm).

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A process for producing a patterned, optically transparent electrically conducting film on a substrate comprising:
    (a) providing a substrate coated with a continuous layer of an optically transparent electrically conductive material;
    (b) depositing by screen printing on selected areas of said layer an etchant composition comprising an acid etchant for said optically transparent electrically conductive material and a carrier therefor, said etchant being capable of reacting with said optically transparent electrically conductive material to form soluble reaction products;
    (c) allowing said etchant composition to contact said optically transparent electrically conductive material until said material has reacted with said etchant in said selected areas;
    (d) removing from said substrate the etchant composition and the products of reaction between said etchant and said optically transparent electrically conductive material.

2. The process of claim 1, wherein said inert carrier is a carrier suitable for screen printing.

3. The process of claim 2 wherein said carrier is a viscous essential oil.

4. The process of claim 1 wherein said electrically conductive material comprises at least one semi-conducting metal oxide.

5. The process of claim 4 wherein said semiconductive metal oxide is selected from the group consisting of indium (III) oxide and tin (IV) oxide.

6. The process of claim 1 wherein said etching composition contains a mineral acid.

7. The process of claim 6 wherein said mineral acid is phosphoric acid.

8. The process of claim 1 wherein step (c) is carried out at temperatures between ambient temperature and 100° C.

9. The process of claim 8 wherein step (c) is carried out at a temperature between 30° and 60° C.

10. The process of claim 8 wherein step (c) is carried out at a temperature of about 60° C.

* * * * *